United States Patent Office 3,466,338
Patented Sept. 9, 1969

3,466,338
PROCESS FOR PRODUCING VINYL CHLORIDE
Kyozo Kaneko, Tadahiro Matsuzawa, and Hideo Okouchi, Niigata-shi, and Takao Nishimura, Yokohama, and Yukimasa Yamamoto, Nishinomiya-shi, Japan, assignors to Japan Gas-Chemical Company, Inc., Chiyoda-ku, Tokyo, Japan, a corporation of Japan
Filed July 30, 1965, Ser. No. 476,130
Claims priority, application Japan, July 17, 1965, 40/43,283
Int. Cl. C07c 21/04, 11/24
U.S. Cl. 260—656                           4 Claims

ABSTRACT OF THE DISCLOSURE

The invention provides an improvement in a process for producing vinyl chloride by directly reacting hydrogen chloride and a gas containing dilute acetylene produced by thermal cracking of hydrocarbons such as propane and naphtha without concentration. The improvement resides in effecting absorption and recovery of higher acetylenes from the starting material gas and recovering vinyl chloride from the reaction product gas by utilizing particular kerosenes.

---

This invention relates to a process for producing vinyl chloride and, in particular, to a process for producing vinyl chloride which comprises effecting the direct reaction between hydrogen chloride and an acetylene-containing cracked gas obtained by the thermal cracking of hydrocarbons, without concentration of the acetylene.

Many attempts have heretofore been made for producing vinyl chloride using the acetylene-containing cracked gas obtained by the thermal cracking of hydrocarbons in its as-obtained state, i.e., without concentrating the dilute acetylene. These processes however had the drawback that a large quantity of gas of complex composition had to be handled. In addition, all the proposed processes had the shortcomings described below, and hence in nearly all cases their practice on a commercial scale has not been realized as yet.

The first difficulty concerned the matter of the selection of the solvent to be used. The acetylene-containing cracked gas obtained by the thermal cracking of hydrocarbons usually contains such higher acetylenes as methyl acetylene, vinyl acetylene and diacetylene, which are exceedingly poisonous to the catalysts used in synthesizing vinyl chloride in that they reduce the catalytic life of the latter. Thus, the foregoing higher acetylenes must be removed by means of their absorption solvents to such an extent that there remains only a trace thereof. Further, after reacting the dilute acetylene with hydrogen chloride, the vinyl chloride must be selectively isolated from the vinyl chloride-containing gas mixture. In the conventional processes, use is made of methanol, ethanol, acetone, dichloroethane and trichloroethylene as the absorption solvents of the foregoing higher acetylenes and/or vinyl chloride. That these solvents are considerably costly is a drawback, however. Furthermore, the vapor pressures at room temeprature of these solvents, as shown below, are considerable and hence when such solvents are contacted with a large quantity of gas, the solvent will be entrained by the gas and carried away, with the consequence that the amount of solvent lost becomes exceedingly great. Further, a need arises for a large-scale recovery apparatus for preventing the loss of the solvent, and as a result, a further increase in costs is inevitable.

Solvent:                    Vapor pressure at 20° C., mm. Hg
Methanol _____ about 100
Ethanol _____ 40
Acetone _____ 180
1,1-dichloroethane _____ 180
1,2-dichloroethane _____ 70
Trichloroethylene _____ 60

On the other hand, the process wherein dimethylformamide is used as the absorbent of higher acetylenes has the shortcomings in that not only is this solvent costly but also in that there is required a very complicated operation for absorbing the acetylenes in a large quantity and then fractionally stripping the so absorbed acetylenes. A process of using naphtha as the absorbent of the higher acetylenes and the vinyl chloride is also known. In this case however, naphtha has a boiling range of considerable breadth in which are included lower hydrocarbons whose properties are very similar to those of vinyl chloride so as to make the isolation of vinyl chloride therefrom a difficult matter. When such components are admixed with the product vinyl chloride, adverse effects are had when polymerizing the latter.

The second difficulty involved in the process wherein dilute acetylene is used as the starting material is the matter of how to produce the acetylene (vinyl chloride) from the starting material hydrocarbons and how to utilize the components other than acetylene that are contained in the cracked gas resulting from the thermal cracking of hydrocarbons. U.S. Patent 2,830,102 discloses a process wherein the hydrogen in the cracked gas is reacted with chlorine, after which the resulting hydrogen chloride is reacted with acetylene. However, in this process, chlorine is required as an auxiliary material in an amount equivalent to or more than the acetylene. Hence, there arises the problem that a considerable amount of excess hydrogen chloride is formed. On the other hand, in Japanese patent application publication No. 28,305/1964, a process is disclosed wherein the ethylene in the cracked gas is reacted with chlorine to form dichloroethane, and thereafter the hydrogen chloride formed when converting the dichloroethane to vinyl chloride is further reacted with acetylene. Although this process is featured in that it utilizes the ethylene in the cracked gas, its shortcoming resides in such points as that it must be so operated that the ethylene and acetylene are present in substantially equimolar quantities and that the equipment as a whole becomes large since complicated operations and equipment are needed for utilizing the ethylene.

A primary object of the present invention is to eliminate the foregoing shortcomings of the prior art processes and thereby provide a process for producing vinyl chloride whose operation is very simple and hence whose cost of production is very low.

Another object of the invention is to provide a process for producing vinyl chloride wherein the removal of the higher acetylenes and the absorption of the vinyl chloride are satisfactorily carried out and moreover in which, as the solvent, is used kerosene whose loss in the foregoing processing steps is much less than that of the conventional solvents and which moreover can be obtained at low cost.

A further object of this invention is to provide a process for producing vinyl chloride which can reduce the higher acetylenes in the acetylene-containing cracked gas to about 50 p.p.m. and hence make it possible to maintain the activity of the catalyst for synthesizing vinyl chloride over a very long period.

Still another object of the invention is to provide a process for producing vinyl chloride wherein the starting material hydrocarbons are utilized substantially completely.

A still further object of the invention is to provide a process for producing vinyl chloride wherein an acetylene-containing gas is produced with high efficiency from petroleum naphtha, which gas is then reacted in its as-obtained state with hydrogen chloride, and all of the remaining waste gas is used as a fuel for the thermal cracking of the petroleum naphtha.

An additional object of the invention is to provide a process for producing vinyl chloride from dilute acetylene, using hydrogen chloride which is obtained in great quantities as a by-product of the synthesis industry and which is of considerably lower cost than chlorine.

Other objects and advantages of the present invention will be apparent from the following description.

The foregoing objects are achieved by a process for producing vinyl chloride in accordance with the present invention, wherein in a process for producing vinyl chloride which comprises effecting the direct reaction between hydrogen chloride and an acetylene-containing cracked gas obtained by the thermal cracking of hydrocarbons, without concentration of the acetylene, the higher actylenes contained in said cracked gas are removed by absorption by means of a kerosene containing fractions having an initial boiling point of not less than 150° C. and the vinyl chloride formed is isolated by absorption by means of a kerosene containing fractions having an initial boiling point of not less than 110° C.

According to the invention process, hydrocarbons are thermally cracked under the conditions of a temperature at the completion of the reaction of at least 1200° C., and preferably between 1200° and 1500° C. As the rate of formation of acetylene in the cracked gas decreases if the temperature at the completion of the reaction falls below 1200° C., such a condition generally becomes unsuitable for the present invention. Hence, by restricting the thermal cracking temperature of the hydrocarbons to within the foregoing range, the yield of acetylene can be raised and a cracked gas having a relatively high acetylene concentration suitable for reacting directly with hydrogen chloride can be prepared. According to the invention process, natural gas, propane, naphtha and the like can be used as the hydrocarbon feed. And as the cracking furnace, any of the known cracking furnaces which can be operated at the aforementioned temperature condition can be employed.

However, as the hydrocarbon feed, the use of petroleum naphtha is especially to be preferred in the invention process. And it is preferred that the thermal cracking be carried out by choosing a contact time between this combustion gas and the naphtha of from $\frac{1}{500}$ to $\frac{1}{250}$ second and at a temperature at the completion of the reaction as hereinabove indicated. The ratio between the hydrocarbon feed and fuel in the thermal cracking step of the invention method is capable of variation over a broad range in accordance with the class of the hydrocarbons and the calorific value of the fuel. In the case of naphtha, for instance, it is convenient to use about 5,000 to 10,000 kilocalories per one liter of the material naphtha. By carrying out the operation under these conditions, all of the components in the cracked gas other than acetylenes and carbon dioxide (the waste gas), as hereinafter described in full, are used as the fuel of the thermal cracking step, the amount of heat required for the thermal cracking step can be substantially completely provided and the complete utilization of the naphtha is possible. As a cracking process which satisfies these conditions, usually the Phillips' Tangential Reactor Acetylene Process is conveniently employed.

In order to remove the carbon and tar contained in the acetylene-containing cracked gas that is formed, the resulting gas is washed with water and kerosene.

This is followed by further washing of this gas with kerosene under pressure to remove the hydrocarbons containing 3 or more carbon atoms, especially the higher acetylenes, by absorption by means of the kerosene. The kerosene used in this step of the invention must contain fractions having initial boiling points of not less than 150° C., a kerosene composed of relatively heavy fractions of above 180° C. being particularly desirable. The use as the absorbent in the invention process of kerosene, and particularly a specified kerosene composed of fractions, such as hereinabove described, first makes it possible to remove conveniently to less than 50 p.p.m., and particularly to about less than 10 p.p.m., those higher acetylenes which are highly poisonous to the catalysts used in the production of vinyl chloride, this being possible without using the costly solvents that were hitherto used. Secondly, the proportion of the solvent being entrained and taken along to the outside of the system by means of the cracked gas can be reduced, as compared with the case with the conventional solvents. Moreover, since the small amount of kerosene which is taken out with the gas is used as a fuel after all, there is no loss from the thermal standpoint. Furthermore, the present invention possesses great merits from the standpoint of process control when it is considered that the life of the catalyst for synthesizing vinyl chloride is maintained active for a long period of time by having restricted, as indicated hereinbefore, the fractional composition of the kerosene. The reason for this is that when fractions of below 150° C. are contained in a kerosene, numerous peaks occur when analyzing for the amount of higher acetylenes contained in the washed gas by means of, say, a hydrogen flame ionizing detector, thus rendering it difficult to carry out the analysis. Another reason is that there is the danger of the catalyst being poisoned. Since the fractions in the kerosene are restricted in the present invention, as hereinbefore indicated, the detection even of a minute quantity of the higher acetylenes is possible and the control for prolonging the life of the catalyst is also made easy.

The acetylene-containing cracked gas which has thus been removed of hydrocarbons containing 3 or more carbon atoms is then dehydrated and mixed with an amount of dry hydrogen chloride gas at least equimolar to that of the acetylene, after which the mixture is introduced into a reactor, which is packed with a catalyst consisting of mercuric chloride, preferably mercuric chloride and barium chloride, supported on active carbon. The foregoing gas mixture is reacted in said reactor under the conditions of a temperature ranging from 100° to 180° C. and a pressure from 3 to 20 atmospheres. The reactor employed may be any of the known reactors. Thus, practically all of the acetylene reacts with the hydrogen chloride to become vinyl chloride. The reaction gas taken out from the reactor is washed with water and the unreacted hydrogen chloride is removed.

This is followed by the recovery of the vinyl chloride from the product gas mixture. According to the invention process, the recovery operation is carried out by contacting the vinyl chloride-containing gas with a kerosene containing fractions having an initial boiling point of not less than 110° C. and effecting the absorption therein of the vinyl chloride.

Kerosene, which is used as the vinyl chloride absorbent in this invention, is of considerably lower cost than the hitherto well-known absorbents such as the chlorides and alcohols. Moreover, since its vapor pressure at room temperature is not more than 5 mm. Hg, the amount that is entrained with the waste gas is much less than in the case of the solvents used heretofore. Further, even if it is entrained with the waste gas, there is no loss, at least from the thermal standpoint, since the waste gas is recycled to the system and utilized as a fuel.

A part of the kerosene which has absorbed the vinyl chloride is heated in a stripping tower at normal atmospheric pressure until it boils. In this manner, the vinyl chloride is stripped efficiently from the kerosene. The component resulting from boiling the kerosene is vinyl chloride of high concentration after the vaporous kerosene component has been condensed and separated therefrom. This vinyl chloride can be readily liquified by compressing and cooling. By degassing this and rectifying it, the final product is obtained. Thus, there is a marked difference between the above-described invention process and the instance where, for instance, naphtha is used as the solvent. Namely, the invention process wherein is used a kerosene composed of components having an initial boiling point of not less than 110° C. is superior to the instance where, say, naphtha is used as the solvent in that neither does the kerosene form an azeotropic mixture with the vinyl chloride nor are there contained therein such lower hydrocarbons whose properties are similar to vinyl chloride and hence become admixed therein to render their separation difficult.

According to the present invention, the kerosene having an initial boiling point of not less than 150° C., which is used for absorbing the higher acetylenes, can also be used as the kerosene for absorbing the vinyl chloride. In this case, although it is necessary to raise the stripping temperature of the vinyl chloride to higher than that necessary in the case of the kerosene for absorbing the vinyl chloride, which has a lower initial boiling point (when heating with steam, its pressure will be raised), there is the advantage that the same solvent can be used for the whole absorbent system.

Although the kerosene containing the specified fractions and used in the present invention as absorbent is generally that obtained from petroleum hydrocarbon materials, it is not necessarily so limited. For instance, even though it is one obtained from such materials as coal, it is to be understood that it can be used equally as the absorbent so long as it is one which contains similar fractions as the hereinbefore described kerosene.

In a preferred mode of the invention, the waste gas discharged from the top of the tower for absorbing the vinyl chloride, after having been freed of some of its carbon dioxide, is recycled to the thermal cracking step as the fuel for effecting the thermal cracking of the hydrocarbons. Namely, in this preferred mode, by effecting the thermal cracking of the hydrocarbon feed, particularly petroleum naphtha, with a temperature at the completion of the reaction of from 1200° to 1500° C. and preferably a contact time between the burning gas and the naphtha of $1/500$ to $1/250$ second, the fuel for the naphtha cracking furnace can be supplied without excess or deficiency by means of this waste gas. Hence, it becomes possible to balance substantially completely the input and output of the material as well as the heat of the whole system.

The gas thermally cracked in accordance with the invention, using naphtha as the starting material, has, for example, the following composition:

| | Mol percent |
|---|---|
| Acetylene | 13.4 |
| Methyl acetylene | 0.2 |
| Diacetylene | 0.5 |
| Vinyl acetylene | 0.2 |
| Methane | 9.1 |
| Ethane | 0.1 |
| Ethylene | 2.9 |
| Hydrogen | 33.6 |
| Carbon monoxide | 12.9 |
| Carbon dioxide | 21.8 |
| Nitrogen | 5.3 |
| Total | 100.0 |

The cracked gas from which the acetylenes and carbon dioxide have been removed attains a calorific value of as high as 3800 kilo calories/Nm.$^3$(net). Moreover, the yield of acetylene from the material petroleum naphtha is a high rate of such as 40 to 53% by weight, of which at least 94 mol percent is converted to vinyl chloride. And since the remainder is all used as the heat source for cracking the naphtha, there is no waste at all. Thus, it is clear that, when the present process is followed, generally an amount ranging between a minimum of 40% by weight and a maximum of 53% by weight of the naphtha material used is converted to vinyl chloride, while the remainder can be used as the heat source for cracking the naphtha itself to acetylene. Heretofore, in the processes for producing vinyl chloride from dilute acetylene, there was no process at all which, as in the case with the present invention, possessed in combination a good yield of acetylene with a balanced thermal input and output. Hence, these effects of the present invention are also not obvious in the least from the prior art.

For a better understanding of the present invention, the accompanying drawings will be referred to, wherein.

Figure 1:
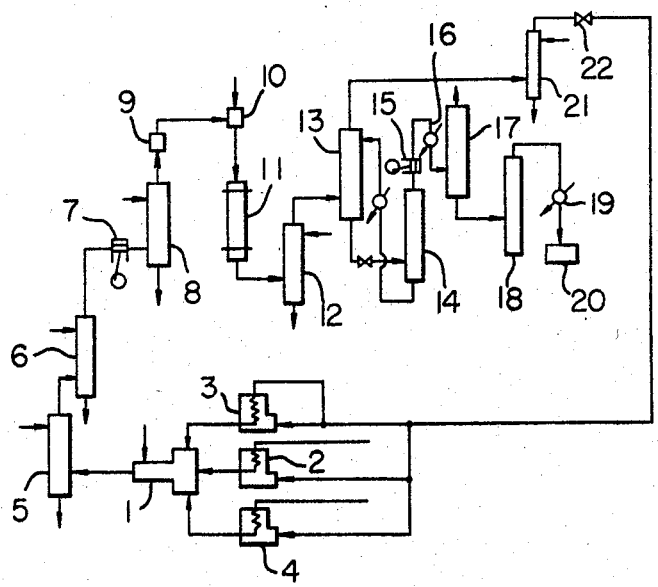
FIGURE 1 is a schematic view illustrating the invention process.

Referring to FIGURE 1, the fuel gas and oxygen which are both heated to about 600° C. in furnaces 3 and 4, respectively, are introduced into the combustion chamber of a cracking furnace 1 where perfect combustion is effected to make a burning gas of above 2000° C. On the other hand, the hydrocarbon feed, for example, a mixture of petroleum naphtha and steam, is heated to about 600° C. in a furnace 2. Then this hydrocarbon feed is mixed vigorously in the foregoing burning gas of above 2000° C. and the reaction is carried out for about $1/500$ to $1/250$ second. At a temperature of 1200° to 1500° C. at the completion of the reaction, water is jetted into the gas to quench it and stop the reaction. By operating in this manner, the yield of acetylene from the petroleum naphtha reaches 40 to 53% by weight, particularly 50 to 53% by weight, and the cracked gas contains 9 to 14 mol percent of acetylene and $1/3$ to $1/20$ thereof of ethylene. Besides this, it also contains CO, $CO_2$, $CH_4$, $O_2$, $N_2$, propylene, methyl acetylene, allene, vinyl acetylene, diacetylene, butylene, butadiene, benzene, naphthalene, carbon and tar. Of these, benzene, naphthalene, carbon and tar become causes for mechanical hindrance; so they are washed and removed at a water-washing tower 5 and a kerosene-washing tower 6. On the other hand, the higher acetylenes such as methyl acetylene, vinyl acetylene and diacetylene become catalyst poisons, while the higher olefins (particularly the diolefins) such as propylene, allene, butylene and butadiene become polymerization inhibitors of vinyl chloride. Hence, these are absorbed and removed at the kerosene-absorption tower 8 under a pressure of 3 to 20 atmospheres, the cracked gas having been made to proceed via a compressor 7. The gas is dried in a dehydrating device 9, then mixed in a mixer 10 with a more than equimolar amount, based on the acetylene, of dry hydrogen chloride gas, after which the gas mixture is reacted in a reactor 11 over a mercuric chloride and barium chloride-on-active carbon catalyst, at a temperature of 100° to 180° C. and a pressure of 3 to 20 atmospheres, to convert practically all of the acetylene to vinyl chloride. At a water-washing tower 12 the minute amount of remaining hydrogen chloride is washed with water and removed, following which the vinyl chloride is absorbed by means of kerosene at an absorption tower 13 under the foregoing pressure. The absorbed vinyl chloride is then stripped at a stripping tower 14 by heating the kerosene to 110° to 200° C. at normal atmospheric pressure. The stripped vinyl chloride is compressed to from 3 to 10 atmospheres at a compressor 15, followed by cooling and liquefying at a condenser 16, after which the remaining gases such as $CO_2$, $CH_4$, ethylene, propylene and acetylenes are stripped. The product vinyl chloride is thereafter closely distilled at a rectifying tower 18, cooled and liquified at a condenser 19, and the liquified vinyl chloride is then stored in a storage tank 20. On the other hand, the waste gas which is discharged from the top of the absorption tower 13 is freed of its carbon dioxide at a pressured water-washing tower 21 and thence is freed of its pressure and discharged via a pressure reducing valve 22 to be reused as a heat source for cracking the naphtha.

In reacting the acetylene-containing cracked gas with the hydrogen chloride in the preferred mode of the invention process, the gas mixture is made to contact the mercuric chloride catalyst layers in a sequence starting from that portion where its activity has decreased most by its having been used, or in other words, in such a fashion that the stream of the gas mixture flows countercurrently with respect to the direction of the decrease in activity of the catalyst layers. Namely, the gas mixture is first introduced into the catalyst layer which is the oldest and hence whose activity is the least. The gas mixture is then progressively contacted with the catalyst layers having higher activity, and finally by contacting the gas mixture with the catalyst layer, which is the freshest and of the highest activity, the reaction of the acetylene with the hydrogen chloride is completed to yield the intended vinyl chloride. For carrying out this process, the method of using a plurality of fixed catalytic reactors connected in series, or the multiplate fluidized method or the moving bed reactor can be used. In this case, the activity of the system as a whole can be maintained at a constant level by feeding fresh catalyst continuously or intermittently from the end from which the reacted gas is taken out while the catalyst whose activity has been completely exhausted is taken out continuously or intermittently from the end from which the gas mixture is being introduced. Thus, the reaction rate and the space time yield can always be maintained constant. Further, according to the present mode, the catalyst can be used until its activity is completely exhausted. In addition, by utilizing the adsorbability of the active carbon of the already used-up catalyst in a stage prior to the introduction of the gas mixture to the reactor, the removal of such impurities as the higher acetylenes can be accomplished in a still more complete manner.

Figure 2:
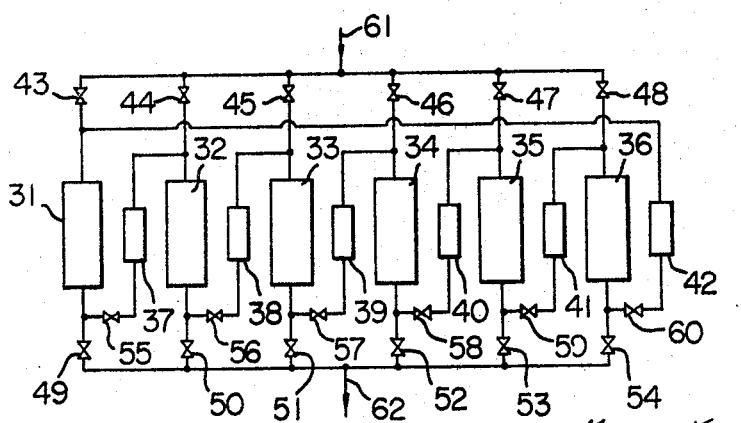
FIGURE 2 is a schematic view illustrating a preferred mode of practicing the invention in the case where a plurality of reactors are used.

In FIGURE 2 this mode will be described further. In the figure, the reference numerals 31, 32, 33, 34, 35 and 36 indicate the several reactors having fixed catalyst beds which are packed with a mercuric chloride-on-active carbon catalyst. Heat exchangers 37, 38, 39, 40, 41 and 42 are adapted to either cool or heat the passing gas. 43–60, as shown in FIGURE 2, are valves which are capable of closing or opening the system of connecting pipes and 61 and 62 are respectively the inlet for the material gas and the outlet for the product. The catalyst in the reactor 31 is the oldest catalyst and is practically exhausted of its catalytic activity but still possesses it adsorptive capacity. The catalysts in reactors 32, 33, 34 and 35 are successively fresher and hence possess successively higher catalytic activities. The reactor 36 illustrates the instance where a fresh catalyst is being exchanged for the catalyst which, being in a state of exhaustion as in the case with the catalyst of the reactor 31, is being discarded. The dilute acetylene-containing gas, which evolves from the hydrocarbon cracking furnace, is first freed of its carbon and tar. Then after being freed of almost all of its higher acetylene series hydrocarbons by means of kerosene, it is dried and then mixed with hydrogen chloride gas. This gas mixture enters the reactor 31 at room temperature from the inlet 61 of the present apparatus. At this reactor 31, the higher acetylene series hydrocarbons and other impurities which remain in minute quantities are removed still more completely.

Next, the material gas is heated to 90° C. by means of the heat exchanger 37 and enters the reactor 32 where, say, about 25% of the acetylene is reacted and the temperature of the gas at the outlet rises to about 150° C. This gas is cooled to 90° C. by means of the heat exchanger 38 and enters the reactor 33 where likewise about 25% of the acetylene is reacted and the temperature at the outlet becomes about 150° C. Subsequently, by operating in a similar manner, the product gas which leaves the reactor 35 becomes a gas containing practically no acetylene and proceeds via outlet 62 to the vinyl chloride collecting device. When the activity of the catalyst in the reactor 32 gradually declines with the elapse of time by operating in this manner, the reaction load is gradually transferred to the reactors 33, 34 and 35 by adjusting the operation of the heat exchangers 38, 39 and 40 and the reaction temperatures. When the catalytic activity of the reactor 32 falls to its extreme, the reactor 31 is cut off by manipulating the valve, and the reactor 32 takes its place. The reactor 36, whose packing with a fresh catalyst has been completed, is connected next to the reactor 35, and thereafter the reaction is resumed, the operation being as hereinbefore described. The reactor 31 now goes into its catalyst repacking operation.

In the step of absorbing the higher acetylenes by means of kerosene in this invention, some of the acetylene becomes dissolved in the kerosene. Now, if the acetylene in the kerosene is stripped into air in this state, a loss of the acetylene will occur. Accordingly, in the prefered mode of the invention, a portion of the waste gas is contacted countercurrently with the kerosene which has absorbed the higher acetylenes thereby recovering the acetylene which is in solution in the kerosene. The regeneration of the kerosene which has been utilized in the absorption of the higher acetylenes is carried out in two stages. By countercurrently contacting the kerosene with the waste gas at the first stripping tower, the acetylene in solution in the kerosene is only fractionally stripped utilizing the difference in solubility. Next, after having fractionally stripped the acetylene, the kerosene is delivered to a second stripping tower where it is heated at normal atmospheric pressure and contacted countercurrently with air, thereby completely stripping the higher acetylenes, following which the stripped gas is discharged. When the stripping of acetylene is carried out merely by reducing the pressure, the evaporation of the acetylene is not thorough. By using a part of the waste gas which has been formed as a by-product, it also becomes possible to recycle the recovered acetylene to the material gas as the material to be reacted with the hydrogen chloride.

The life of the mercuric chloride catalyst used in the invention process for synthesizing vinyl chloride can be maintained over a much longer period than that of the conventional processes, because the higher acetylenes have been removed to such an extent that only traces thereof remain. This catalyst however tends to be susceptible to reduction by means of reducing substances contained in the gas mixture. Thus, there may be occasions where a further prolongation of the activity of the catalyst becomes difficult. In this case, the activity of the catalyst can be recovered considerably by enveloping the catalyst in situ with chlorine or hydrogen chloride, without removing it from the position it is in during the reaction process.

In producing vinyl chloride from dilute acetylene, the critical feature of the invention process resides in the use as the absorbent solvent for the vinyl chloride and the higher acetylenes, respectively, of kerosenes composed of restricted fractions. A great difference exists between the fact that kerosene was known hitherto as merely a solvent of vinyl chloride and the fact it can produce vinyl chloride on a commercial scale by selectively absorbing and stripping vinyl chloride from a complicated system wherein are admixed various gas components. In addition, according to the present invention, a kerosene containing specific fractions is also used for absorbing the higher acetylenes contained in the material gas, with the consequence that the content of the higher acetylenes is reduced to below 50 p.p.m., and preferably even to not more than 10 p.p.m., thus making it possible to prolong greatly the life of the catalyst for synthesizing vinyl chloride. Moreover, in view of the fact that in this invention absorbents, which are essentially common (though their boiling range differ somewhat) i.e., kerosenes, are used for the higher acetylenes and the vinyl chloride, there is no possibility of the absorbents contaminating each other. Further, even when these absorbents are contaminated as a result of their use over an extended period of time, the spent solvent need not be repurified but can be effectively used as a fuel, since the cost of kerosene is very low when compared with the other solvents. Therefore, as compared with the prior art processes, the present process which uses kerosene as the absorbent has the advantage that the cost of the absorption step is exceedingly low, and thus the process of the present invention is highly superior from the economic standpoint.

Another advantage of the invention process is that by combining the several steps of this process in accordance with the hereinbefore noted conditions acetylene can be obtained from the hydrocarbon feed in a good yield of as much as 40–53% by weight while the remainder which has been cracked to other gases can be used as the fuel for the thermal cracking of the hydrocarbon feed, and hence substantially no excess or deficiency occurs. In short, there is no waste at all from the standpoint of material balance and heat balance when the present invention is followed, since complete use is made of the hydrocarbon feed, about one half thereof being converted completely to acetylene (and hence to vinyl chloride) and about one half being used as a fuel for the thermal cracking of the feed itself.

A further advantage of the invention process is its use of hydrogen chloride, a material of considerably lower cost than chlorine. Hydrogen chloride is obtained in great quantities in the synthetic industry as a by-product, and hence by using this by-product hydrogen chloride, a great reduction in the cost of producing vinyl chloride is possible by means of the present invention.

Consequently, the invention process makes it possible to produce vinyl chloride from dilute acetylene at a considerably lower cost than the prior art processes on account of the following reasons: (1) the cost of the absorption step is lower; (2) the hydrocarbon feed is utilized almost completely; (3) the low-cost hydrogen chloride is used as an auxiliary material; and (4) the processing steps have been simplified and hence the equipment cost is low.

The following exampes are given for illustrating the invention, it being understood that these are given in an illustrative sense and in no way to be construed as limiting the invention.

Example 1

A gas mixture consisting of 8.2 mol percent of acetylene, 1.1 mol percent of ethylene, 833 p.p.m. of methyl acetylene and 90.6 mol percent of inert gases (hydrogen, carbon monoxide, carbon dioxide, methane and nitrogen) was delivered to a higher acetylene absorption tower under a pressure of 6.9 atm. at the rate of 35.3 Nm.$^3$/hr. When this gas mixture was washed by flowing down from the top of the tower at the rate of 510 l./hr. a kerosene containing fractions of above 180° C. and cooled to 5° C., the methyl acetylene content was reduced to 47 p.p.m. At this time, neither was there any trouble in analyzing the gas at the outlet of the absorption tower nor was there any adverse effects on the activity of the catalyst in the vinyl chloride synthesizing step even though a continuous operation of 500 hours was carried out. The gas coming out from the absorption tower outlet, after being dehydrated, was mixed with about 3.1 Nm.$^3$/hr. of dry hydrogen chloride and then fed to a reactor packed with a catalyst consisting of mercuric chloride and barium chloride supported on a carrier.

The gas coming out from the reactor outlet was delivered to a water-washing tower. The gas mixture obtained at the rate of 34 Nm.$^3$/hr. after removing the residual hydrogen chloride and composed of 8.0 mol percent of vinyl chloride, 0.1 mol percent of acetylene, 0.9 mol percent of ethylene and 91.0 mol percent of inert gases was delivered to the vinyl chloride absorption tower under a pressure of 5.2 atm. When this gas mixture was washed by flowing down from the top of the tower at the rate of 380 l./hr. a kerosene containing fractions of above 110° C. and cooled to 8° C., vinyl chloride could be absorbed until the content thereof in the gas mixture reached 51 p.p.m. When this kerosene was boiled at about 130° C. under normal atmospheric pressure by heating with 160° C. steam, the amount of vinyl chloride in the kerosene decreased from 2.6% by weight to 0% by weight, and even though this was repeatedly used, there was no adverse effects on its effectiveness for absorbing vinyl chloride. Further, the kerosene was not contaminated even though the operation was continuously carried out for 500 hours. The loss from evaporation was also very small. Thus, it was possible to produce 7.6 kg./hr. of vinyl chloride.

Example 2

Natural gas at the rate of 60 Nm.$^3$/hr. and oxygen at the rate of 120 Nm.$^3$/hr. were both heated to 600° C. and then these were burned at a temperature above 2000° C. in a combustion chamber of a naphtha cracking furnace. Petroleum naphtha at the rate of 80 kg./hr. and steam likewise at 80 kg./hr. were both heated to 600° C. and then mixed in with the foregoing burning gas. About 1/400 second later, the burning gas mixture was quenched with a jet of water at 1350° C. to cool the gas mixture to about 150° C. When the resulting cracked gas was washed with water and kerosene, the carbon, tar, naphthalene and benzene were removed and a pure gas containing 13.1 mol percent of acetylene, 1.5 mol percent of ethylene, 6.7 mol percent of methane, 15.4 mol percent of carbon dioxide, 23.8 mol percent of carbon monoxide, 36.8 mol percent of hydrogen and 1.3 mol percent of nitrogen as well as hydrocarbons of 3 or more carbon atoms such as propylene, methyl acetylene, allene, vinyl acetylene, diacetylene, butylene and butadiene totaling 1.4 mol percent was obtained at the rate of 230.8 Nm.$^3$/hr. This gas was compressed to 10 atm. and was washed at 0° C. with a kerosene containing fractions of above 180° C., the kerosene being used at the rate of 2.2 m.$^3$/hr. As a result, the content of hydrocarbons of 3 or more carbon atoms was reduced to less than 50 p.p.m. (the higher acetylenes to less than 10 p.p.m.). Next, this gas was dehydrated and dried, after which it was mixed with hydrogen chloride at the rate of about 30.4 Nm.$^3$/hr. followed by carrying out the reaction over a catalyst consisting of mercuric chloride and barium chloride supported on a carrier, at 150° C. and 9.5 atom, whereup 99.8% of the acetylene was reacted and was converted to vinyl chloride. This was followed by washing the reaction gas with water to remove the unreacted hydrogen chloride, after which the vinyl chloride was absorbed with a kerosene of an initial boiling point above 110° C., using the kerosene at the rate of 1.5 m.$^3$/hr. under a pressure of 9 atm. at 0° C. This kerosene was then boiled at normal atmospheric pressure to strip the vinyl chloride. By compressing the stripped vinyl chloride gas at 10 atm., liquifying it by cooling it to below 40° C., followed by degassing and rectification, liquified vinyl chloride was obtained at the rate 79.5 kg./hr. The purity of the vinyl chloride obtained was 99.998% and its yield was 94 mol percent based on the starting dilute acetylene. The gas remaining after having removed the vinyl chloride from the reaction gas was washed with water at 9 atm. to remove a major portion of the $CO_2$ and obtain at the rate of 148 Nm.$^3$/hr. a gas composed of 2.3 mol percent of ethylene, 10.5 mol percent of methane, 24.1 mol percent of carbon monoxide, 57.5 mol percent of hydrogen, 3.6 mol percent of carbon dioxide and 2 mol percent of nitrogen, whose calorific value was about 3500 kilocalories/Nm.$^3$ net. Thus, its total calorific value amounts to 519,000 kilocalories per hour. The pressure of this gas was reduced and by feeding it as a fuel to the naphtha preheating furnace requiring 49,000 kilocalories per hour, the furnace for preheating the fuel for use inside the cracking furnace and the oxygen preheating furnace, requiring respectively 42,000 and 27,000 kilocalories per hour, and also as the fuel for the inside of the cracking furnace at the rate of 121.5 Nm.$^3$ per hour, i.e., 425,000 kilocalories, the fuel requirements were satisfied. In this case, although there occurred a deficiency of 24,000 kilocalories per hour, this amounted to only 4.6% of the total calorific value of the gas. Thus, since the fuel requirements were satisfied as described above, the natural gas that was used initially became unnecessary.

Example 3

This example illustrates the method of recovering the acetylene from the kerosene used for absorbing the higher acetylenes.

The kerosene which had absorbed the higher acetylenes in Example 1 was drawn from the botom of the absorption tower and, after heating to 37° C., was flowed down from the top of the first stripping tower under a pressure of 3.4 atm. Then when a part of the waste gas discharged from the top of the vinyl chloride absorption tower was blown in at the rate of 3.2 Nm.$^3$/hr. from the bottom of the first stripping tower and caused to contact the kerosene countercurrently, the acetylene content of the kerosene at the outlet of the first stripping tower declined from the 0.71 N l./l. when no waste gas was blown in to 0.06 N l./l. when the waste gas was blown in. Thus, it was possible to recover about 90% of the acetylene which was absorbed by the kerosene used for absorbing the higher acetylenes. Further, the gas leaving the outlet at the top of the first stripping tower was composed of 8.8 mol percent of acetylene and 1624 p.p.m. of methyl acetylene and was fully usable as the material gas.

Example 4

Natural gas at the rate of 65 Nm.$^3$/hr. and oxygen at the rate of 135 Nm.$^3$/hr. were both heated to 600° C. and then these were burned at above 2000° C. in a combustion chamber of a cracking furnace. Propane at the rate of 75 kg./hr. along with steam at the rate of 85 kg./hr. was heated to 600° C. and then mixed in with the foregoing burning gas. About $\frac{1}{400}$ second later, the burning gas mixture was quenched with a jet of water at 1350° C. to cool the gas mixture to about 150° C. When the resulting cracked gas was washed with water and kerosene, the carbon, tar, naphthalene and benzene were removed and a pure gas containing 8.5 mol percent of acetylene, 0.8 mol percent of ethylene, 6.5 mol percent of methane, 17.3 mol percent of carbon monoxide, 22.4% of carbon dioxide, 42.1 mol percent of hydrogen, 0.7 mol percent of oxygen and 1.2 mol percent of nitrogen as well as hydrocarbons of 3 or more carbons such as propylene, methyl acetylene, allene, vinyl acetylene, diacetylene, butylene and butadiene totaling 0.5 mol percent was obtained at the rate of 284 Nm.$^3$/hr. This gas was compressed to 10 atm. and was washed at 0° C. with a kerosene containing fractions of above 180° C., the kerosene being used at the rate of 2.2 m.$^3$/hr., thereby removing completely the hydrocarbons of 3 or more carbons contained in the gas. Then, after dehydrating the gas, it was mixed with hydrogen chloride fed at the rate of 25 Nm.$^3$/hr., followed by carrying out the reaction at 150° C. and 9.5 atm. over a catalyst consisting of mercuric chloride and barium chloride supported on a carrier, whereupon 99.8% of the acetylene was reacted and was converted to vinyl chloride. This was followed by washing the reaction gas with water to remove the unreacted hydrogen chloride, after which the vinyl chloride was completely absorbed with a kerosene of an initial boiling point above 110° C., using the kerosene at the rate of 2.0 m.$^3$/hr. under a pressure of 9 atm. at 0° C. This kerosene was then boiled at normal atmospheric pressure to strip the vinyl chloride. By compressing the stripped vinyl chloride gas at 10 atm., liquifying it by cooling to below 40° C., followed by degassing and rectification at 8 atm., liquified vinyl chloride was obtained at the rate of 63 kg./hr. The purity of the vinyl chloride so obtained was 99.999% and its yield was 94 mol percent based on the starting dilute acetylene.

Example 5

This example illustrates the instance of producing vinyl chloride from the cracked gas of petroleum naphtha utilizing a reactor of the type shown in FIGURE 2. Vinyl chloride was produced as in Example 1 except that the reactor used was of the type shown in FIGURE 2 and the conditions of the reaction were as indicated below.

The reaction conditions and the results obtained are given below. The freshly prepared catalyst maintained its activity over a period of about 2000 hours.

Composition of the gas at the inlet:
    Acetylene _____ Nm.$^3$/hr.___ 2.80
    Hydrogen chloride gas _____ Nm.$^3$/hr.___ 3.10
    Hydrogen, carbon monoxide, etc. __ Nm.$^3$/hr.___ 31.0
    Methyl acetylene, etc. _____ p.p.m.___ 47

Composition of the freshly prepared catalyst:
    Active carbon _____ parts__ 75
    Mercuric chloride _____ do____ 12.5
    Barium chloride _____ do____ 12.5

Reaction temperature:

| | Reactor, ° C. | | | | |
|---|---|---|---|---|---|
| (1) | (2) | (3) | (4) | (5) | (6) |
| Inlet _____ Room temp _____ | 92.5 | 89 | 90 | 91.5 | _____ |
| Outlet _____ do _____ | 156 | 148 | 155 | 147 | _____ |

Reaction pressure—6 atm.
Space velocity—600 l./l./hr. N.T.P., 2400 l./l./hr. N.T.P. per reactor
Composition of the gas at outlet:

Nm.$^3$/hr.
    Vinyl chloride _____ 2.72
    Acetylene _____ 0.08
    Hydrogen chloride _____ 0.38
    Hydrogen, carbon monoxide, etc. _____ 31.0

Example 6

This example illustrates the method of recovering the activity of the catalyst which has been used for synthesizing the vinyl chloride.

When, in Example 1, the gas mixture was passed through and reacted, using four iron tubes, in which were packed 30 l. of catalyst consisting of active carbon adsorbed with 12.5% by weight of mercuric chloride and 12.5% by weight of barium chloride, at a temperature of 150° C., a pressure of 6 atm. and a space velocity of 1200 hr.$^{-1}$(N.T.P.), at first, a reaction rate of 99.8% was attained, but after 1200 hours, it declined to 62%. Next when the reaction was stopped, the gas in the reaction tubes was replaced with hydrogen chloride and, after allowing the tubes to stand for 24 hours at room temperature and normal atmospheric pressure, the reaction was again carried out under identical conditions as before, the reaction rate was completely restored and 440 hours were required for it to declined to 62% again.

We claim:
1. A process for the production of vinyl chloride which comprises
    (a) thermally cracking a hydrocarbon selected from the group consisting of petroleum naphtha and propane by contacting said hydrocarbon with a combustion gas under conditions such that the temperature at the completion of the cracking operation is from 1200° C. to 1500° C. and the contact time of the hydrocarbon in the cracking operation is from $\frac{1}{500}$ to $\frac{1}{250}$ second,
    (b) washing the resulting cracked gas stream with water and kerosene to remove carbon and tar therefrom,
    (c) contacting the resultant gas stream under super atmospheric pressure with kerosene having an initial boiling point of not less than 150° C., thus effecting the removal of higher acetylenes from said stream by absorption in kerosene to the extent that the content of said higher acetylene is less than 50 p.p.m.

(d) drying the resultant gas stream, (e) mixing the dry gas stream with anhydrous hydrogen chloride gas and passing the mixture at a temperature of from about 100° C. to about 180° C. at a pressure of from about 3 to 20 atmospheres over a mercuric chloride-on-active carbon catalyst to convert acetylene to vinyl chloride, (f) contacting the reaction gas mixture with water to remove unreacted hydrogen chloride, (g) contacting the resultant gas stream with kerosene having an initial boiling point of not less than 110° C. to absorb the vinyl chloride product, and (h) stripping the vinyl chloride from the kerosene.

2. A process as in claim 1 wherein a portion of the waste gas remaining after the removal of the product vinyl chloride is contacted countercurrently with the kerosene containing absorbed higher acetylenes in order to remove acetylene dissolved in said kerosene, thereby recovering the said dissolved acetylene.

3. A process as in claim 1 wherein the mixture of dry gas stream and anhydrous hydrogen chloride is contacted with the catalyst sequentially from the older catalyst zones to the fresher catalyst zones.

4. A process as in claim 1 wherein the waste gas obtained when the vinyl chloride is absorbed in the kerosene is recycled to the thermal cracking stage as fuel for the thermal cracking.

References Cited

UNITED STATES PATENTS

| | | | |
|---|---|---|---|
| 3,145,236 | 8/1964 | Leroux et al. | 260—656 |
| 2,407,701 | 9/1946 | Jones et al. | 260—656 |
| 2,858,347 | 10/1958 | Hutchings | 260—656 |
| 2,242,225 | 3/1966 | Danz et al. | 260—679 X |
| 3,299,161 | 1/1967 | Braconier et al. | 260—679 X |

FOREIGN PATENTS 248,955  1/1964  Australia.

BERNARD HELFIN, Primary Examiner

J. BOSKA, Assistant Examiner

U.S. Cl. X.R.

260—679